United States Patent
Fan et al.

(10) Patent No.: US 10,649,994 B2
(45) Date of Patent: May 12, 2020

(54) BOUNDED QUERY REWRITING USING VIEWS

(71) Applicant: Futurewei Technologies, Inc., Plano, TX (US)

(72) Inventors: Wenfei Fan, Wayne, PA (US); Yang Cao, Edinburgh (GB); Floris Geerts, Berchem (BE); Ping Lu, Beijing (CN); Yu Chen, San Jose, CA (US); Demai Ni, Danville, CA (US)

(73) Assignee: Futurewei Technologies, Inc., Plano, TX (US)

( * ) Notice: Subject to any disclaimer, the term of this patent is extended or adjusted under 35 U.S.C. 154(b) by 192 days.

(21) Appl. No.: 15/966,465

(22) Filed: Apr. 30, 2018

(65) Prior Publication Data

US 2018/0341677 A1    Nov. 29, 2018

Related U.S. Application Data (60) Provisional application No. 62/511,191, filed on May 25, 2017.

(51) Int. Cl.
*G06F 16/00* (2019.01)
*G06F 16/2453* (2019.01)

(52) U.S. Cl.
CPC .. *G06F 16/24542* (2019.01); *G06F 16/24537* (2019.01); *G06F 16/24539* (2019.01)

(58) Field of Classification Search
CPC ......... G06F 16/24537; G06F 16/24539; G06F 16/24542
See application file for complete search history.

(56) References Cited

U.S. PATENT DOCUMENTS

| | | | | |
|---|---|---|---|---|
| 5,600,831 A | * | 2/1997 | Levy | G06F 16/954 |
| 5,991,754 A | * | 11/1999 | Raitto | G06F 16/24539 |
| 6,477,525 B1 | * | 11/2002 | Bello | G06F 16/24539 |
| 6,496,819 B1 | * | 12/2002 | Bello | G06F 16/24537 |
| 6,567,802 B1 | * | 5/2003 | Popa | G06F 16/24542 |

(Continued)

OTHER PUBLICATIONS

Afrati, F., "Determinacy and query rewriting for conjunctive queries and views," Theoretical Computer Science, vol. 412, No. 11, Mar. 11, 2011, pp. 1005-1021.

(Continued)

*Primary Examiner* — Merilyn P Nguyen
(74) *Attorney, Agent, or Firm* — Conley Rose P.C.

(57) ABSTRACT

A mechanism for rewriting a bounded query onto a view is disclosed. A query, access constraints, and cached view(s) are obtained. The cached view(s) contain results of the query as applied to a dataset stored in a database. A query rewriting plan is generated by adding a fetch from query operation to the plan when a rewritten query variable can be fetched from a query constant. A fetch from database operation is added to the plan when a rewritten query variable can be fetched as a query variable that obtains bounded data from the database. An access view operation is added to the plan when a rewritten query variable can be fetched from the cached view. The query rewriting plan is executed to fetch retrieved data. The query is executed on the retrieved data to determine updated results to the query without reapplying the query to the dataset.

20 Claims, 3 Drawing Sheets

(56) References Cited

U.S. PATENT DOCUMENTS

| | | | |
|---|---|---|---|
| 7,774,354 B2* | 8/2010 | Grundler | G06Q 10/10 707/759 |
| 2007/0226203 A1* | 9/2007 | Adya | G06F 16/2445 |

OTHER PUBLICATIONS

Afrati, F., "Using views to generate efficient evaluation plans for queries," ScienceDirect, Journal of Computer and System Sciences, vol. 73, No. 5, Aug. 2007, pp. 703-724.
Armbrust, M., et al., "PIQL: Success-Tolerant Query Processing in the Cloud," Proceedings of the VLDB Endowment, vol. 5, No. 3, Nov. 30, 2011, pp. 181-192.
Armbrust, M., et al., "SCADS: Scale-Independent Storage for Social Computing Applications," CIDR Perspectives, 2009, 7 pages.
Armbrust, M., "Generalized Scale Independence Through Incremental Precomputation," SIGMOD, Jun. 22-27, 2013, pp. 625-636.
Benedikt, M., et al., "Generating Plans for Proofs," ACM Transactions on Database Systems, vol. 40, No. 4, Article V, Feb. 2016, 45 pages.
Cali, A., "Querying Data under Access Limitations," IEEE 24th International Conference on Data Engineering, Apr. 1-12, 2008, pp. 50-59.
Cao, Y., et al., "An Effective Syntax for Bounded Relational Queries," Proceedings of the 2016 International Conference on Management of Data, Jun. 26-Jul. 1, 2016, pp. 599-614.
Cao, Y., et al., "Making Pattern Queries Bounded in Big Graphs," IEEE 31st International Conference on Data Engineering, Apr. 13-17, 2015, pp. 161-172.
Cao, Y., et al., "Bounded Conjunctive Queries," Proceedings of the VLDB Endowment, vol. 7, No. 12, Aug. 2014, pp. 1231-1242.
Cohen, S., et al., "Rewriting Aggregate Queries Using Views," Proceedings of the eighteenth ACM SIGMOD-SIGACT-SIGART symposium on Principles of database systems, May 31-Jun. 3, 1999, pp. 155-166.
Deutsch, A., "Rewriting queries using views with access patterns under integrity constraints," ScienceDirect, Theoretical Computer Science, vol. 371, No. 3, Mar. 2007, pp. 200-226.
"Search Basics," Facebook Help Centre, Mar. 3, 2018, 3 pages.
"Questions You May Have," Facebook Help Centre, Mar. 3, 2018, 2 pages.
Fan, W., et al., "Querying Big Data by Accessing Small Data," Proceedings of the 34th ACM SIGMOD-SIGACT-SIGAI Symposium on Principles of Database Systems, May 31-Jun. 4, 2015, pp. 173-184.
Fan, W. et al., "On Scale Independence for Querying Big Data," Proceedings of the 33rd ACM SIGMOD-SIGACT-SIGART symposium on Principles of database systems, Jun. 22-27, 2014, pp. 51-62.
Van Gelder, A., et al., "Safety and Translation of Relational Calculus Queries," ACM Transactions on Database Systems, vol. 16, No. 2, Jun. 1991, pp. 235-278.
Gottlob, G., et al., "Hypertree Decompositions and Tractable Queries," Journal of Computer and System Science, vol. 64, No. 3, May 2002, pp. 579-627.
Grujie, I., et al., "Collecting and Analyzing Data from E-Goverment Facebook pp.," ICT Innovations Web Proceedings, ISSN 1857-7288, 2014, pp. 86-96.
Halevy, A.Y., "Answering queries using views: A survey," The VLDB Journal, vol. 10, No. 4, pp. 270-294.
Huhtala, Y., et al., "Tane: an Efficient Algorithm for Discovering Functional and Approximate Dependencies," The Computer Journal, vol. 42, No. 2, 1999, pp. 100-111.
Kolaitis, P., et al., "A dichotomy in the complexity of consistent query answering for queries with two atoms," Information Processing Letters, vol. 112, No. 3, Jan. 31, 2012, pp. 77-85.
Kratochvil, J., et al., "Precoloring Extensions with Fixed Color Bound," Acta. Math. Univ. Comenianae, vol. LXII, No. 2, Jan. 1993, pp. 139-153.
Lenzerini, M., et al., "Data Integration: A Theoretical Perspective," Symposium on Principles of Database Systems, Jun. 3-6, 2002, pp. 233-246.
Levy, A., et al., "Answering Queries Using Views," Extended Abstract, PODS, 1995, pp. 95-104.
Li, C., "Computing complete answers to queries in the presence of limited access patterns," The VLDB Journal, Digital Object Identifier, vol. 12, No. 3, Oct. 2003, pp. 211-227.
Nash, A., et al., "Processing First-Order Queries under Limited Access Patterns," Proceedings of the twenty-third ACM SIGMOD-SIGACT-SIGART symposium on Principles of database systems, Jun. 14-16, 2004, pp. 307-318.
Nash, A., et al., "Views and Queries: Determinacy and Rewriting," ACM Transactions on Database Systems, vol. 35, No. 3, Article 21, Jul. 2010, 41 pages.
Rajaraman, A., "Answering Queries Using Templates With Binding Patterns," Extended Abstract, Proceedings of the fourteenth ACM SIGACT-SIGMOD-SIGART symposium on Principles of database systems, May 22-25, 1995, pp. 105-112.
Stockmeyer, L., et al., "The Polynomial-Time Hierarchy," Theoretical Computer Science vol. 3, No. 1, Oct. 1976, 22 pages.
Stolboushkin, A., et al., "Finite Queries Do Not Have Effective Syntax," Information and Computation, vol. 153, No. 1, Aug. 25, 1999, pp. 99-116.
Vardi, M., "On the Complexity of Bounded-Variable Queries," Extended Abstract, Proceedings of the fourteenth ACM SIGACT-SIGMOD-SIGART symposium on Principles of database systems, May 22-26, 1995, pp. 266-276.
Wagner, K., "More Complicated Questions about Maxima and Minima, and some closures of NP," Theoretical Computer Science, vol. 51, No. 1-2, 1987, pp. 53-80.
Cao, Y., et al., "Bounded Query Rewriting Using Views," Appendix A, Proceedings of the 35th ACM SIGMOD-SIGACT-SIGAI Symposium on Principles of Database Systems, Jun. 26-Jul. 1, 2016, 33 pages.
Fan, W., et al., "Incremental Graph Computations: Doable and Undoable," Proceedings of the 2017 ACM International Conference on Management of Data, May 14-19, 2017, 15 pages.

* cited by examiner

BOUNDED QUERY REWRITING USING VIEWS

CROSS-REFERENCE TO RELATED APPLICATIONS

This patent application claims the benefit of U.S. Provisional Patent Application No. 62/511,191, filed May 25, 2017, by Wenfei Fan, et al., and titled "Bounded Query Writing Using Views," which is hereby incorporated in its entirety.

TECHNICAL FIELD

This disclosure is directed to computer implemented searching of graph based datasets, and more particularly to accepting search queries designed to search a big dataset and rewriting such queries to instead search cached views.

BACKGROUND

Searching big datasets can be computationally intensive and time consuming. Specifically, search algorithms can be described in terms of Big O notation. Big O notation describes the limiting behavior of a function when the function's arguments extend towards a particular value (e.g., infinity). Accordingly, Big O notation can be employed to classify algorithms based on changes to run time as the size of the input dataset grows. Unfortunately, even very efficient search algorithms can require significant run times over a big dataset as such algorithms scale according to the size of the dataset. To make query answering feasible in big datasets, mechanisms may be employed to allow algorithms to scale independently of the size of the dataset. This concept is known as scale independence.

SUMMARY

In an embodiment, the disclosure includes a computer-implemented method comprising: obtaining a query and access constraints; selecting a cached view containing results of the query as applied to a dataset stored in a database; generating a query rewriting plan by: adding a fetch from query operation to the query rewriting plan based on the access constraints when a rewritten query variable can be fetched from a query constant, adding a fetch from database operation to the query rewriting plan based on the access constraints when a rewritten query variable can be fetched as a query variable that obtains bounded data from the database, and adding an access view operation to the query rewriting plan when a rewritten query variable can be fetched from the cached view; executing the query rewriting plan to fetch retrieved data; and executing the query on the retrieved data to determine updated results to the query without reapplying the query to the dataset.

Optionally, in any of the preceding aspects, another implementation of the aspect provides obtaining a resource bound, and limiting a number of operations in the query rewriting plan to the resource bound.

Optionally, in any of the preceding aspects, another implementation of the aspect provides, wherein generating the query rewriting plan further comprises iteratively adding operations to the query rewriting plan for corresponding search terms in the query, the operations added as nodes in a search tree.

Optionally, in any of the preceding aspects, another implementation of the aspect provides, wherein executing the query rewriting plan to fetch the retrieved data includes executing a fetch from query operation or a fetch from database operation that fetches an index of a corresponding access constraint.

Optionally, in any of the preceding aspects, another implementation of the aspect provides, wherein the access constraints include one or more cardinality constraints and one or more indices.

Optionally, in any of the preceding aspects, another implementation of the aspect provides, wherein executing the query rewriting plan to fetch the retrieved data includes executing an access view operation to fetch retrieved data from the cached view.

Optionally, in any of the preceding aspects, another implementation of the aspect provides, wherein the query rewriting plan comprises fetch operations, projection operations, selection operations, Cartesian product operations, or renaming operations when the query is a conjunctive query.

Optionally, in any of the preceding aspects, another implementation of the aspect provides, wherein the query rewriting plan comprises fetch operations, projection operations, selection operations, Cartesian product operations, renaming operations, or union operations when the query is a union of conjunctive queries or a positive existential first order logic query.

Optionally, in any of the preceding aspects, another implementation of the aspect provides, wherein the query rewriting plan comprises fetch operations, projection operations, selection operations, Cartesian product operations, renaming operations, union operations, or set difference operations when the query is a first order logic query.

In an embodiment, the disclosure includes a computing device, comprising: a memory storage comprising instructions; and one or more processors in communication with the memory storage, wherein the one or more processors execute the instructions to: obtain a query and access constraints; select a cached view containing results of the query as applied to a dataset stored in a database; generate a query rewriting plan by: adding a fetch from query operation to the query rewriting plan based on the access constraints when a rewritten query variable can be fetched from a query constant, adding a fetch from database operation to the query rewriting plan based on the access constraints when a rewritten query variable can be fetched as a query variable that obtains bounded data from the database, and adding an access view operation to the query rewriting plan when a rewritten query variable can be fetched from the cached view; execute the query rewriting plan to fetch retrieved data; and execute the query on the retrieved data to determine updated results to the query without reapplying the query to the dataset.

Optionally, in any of the preceding aspects, another implementation of the aspect provides, wherein the one or more processors further execute the instructions to obtain a resource bound, and limit a number of operations in the query rewriting plan to the resource bound.

Optionally, in any of the preceding aspects, another implementation of the aspect provides, wherein generating the query rewriting plan further comprises iteratively adding operations to the query rewriting plan for corresponding search terms in the query, the operations added as nodes in a search tree.

Optionally, in any of the preceding aspects, another implementation of the aspect provides, wherein executing the query rewriting plan to fetch the retrieved data includes executing a fetch from query operation or a fetch from database operation that fetches an index of a corresponding access constraint.

Optionally, in any of the preceding aspects, another implementation of the aspect provides, wherein the access constraints include one or more cardinality constraints and one or more indices.

Optionally, in any of the preceding aspects, another implementation of the aspect provides, wherein executing the query rewriting plan to fetch the retrieved data includes executing an access view operation to fetch retrieved data from the cached view.

In an embodiment, the disclosure includes a non-transitory computer-readable medium storing computer instructions that when executed by one or more processors, cause the one or more processors to: obtain a query and access constraints; select a cached view containing results of the query as applied to a dataset stored in a database; generate a query rewriting plan by: adding a fetch from query operation to the query rewriting plan based on the access constraints when a rewritten query variable can be fetched from a query constant, adding a fetch from database operation to the query rewriting plan based on the access constraints when a rewritten query variable can be fetched as a query variable that obtains bounded data from the database, and adding an access view operation to the query rewriting plan when a rewritten query variable can be fetched from the cached view; execute the query rewriting plan to fetch retrieved data; and execute the query on the retrieved data to determine updated results to the query without reapplying the query to the dataset.

Optionally, in any of the preceding aspects, another implementation of the aspect provides, wherein the instructions further cause the one or more processors to: obtain a resource bound; and limit a number of operations in the query rewriting plan to the resource bound.

Optionally, in any of the preceding aspects, another implementation of the aspect provides, wherein generating the query rewriting plan further comprises iteratively adding operations to the query rewriting plan for corresponding search terms in the query, the operations added as nodes in a search tree.

Optionally, in any of the preceding aspects, another implementation of the aspect provides, wherein executing the query rewriting plan to fetch the retrieved data includes executing a fetch from query operation or a fetch from database operation that fetches an index of a corresponding access constraint.

Optionally, in any of the preceding aspects, another implementation of the aspect provides, wherein executing the query rewriting plan to fetch the retrieved data includes executing an access view operation to fetch retrieved data from the cached view.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using a number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Scale independence allows a system to compute a query (Q) in a dataset (D), resulting in the answers, denoted as Q(D), by accessing a bounded amount of data in the dataset regardless of the size of the underlying dataset. Nontrivial queries can be scale independent under a set of cardinality constraints known as access constraints (A). A cardinality constraint is a relational constraint between data, such as one-to-one, one-to-many, many-to-one, etc. An access constraint is a form of cardinality constraint with associated indices. A query is boundedly evaluable, and hence scale independent, when the query can be computed from a fraction of the dataset for all datasets that satisfy the access constraints. Further, to be boundedly evaluable, the time for identifying and fetching the fraction of the dataset are independent of the size of the dataset. This implies that the size of the fraction of the dataset is independent of the size of the dataset.

For boundedly evaluable queries, the fraction of the dataset can be identified based on the cardinality constraints. Further, the fraction of the dataset can be fetched by employing the indices of the access constraints. When experimenting with real-life data, under hundreds of access constraints, seventy seven percent of randomly generated, sixty seven percent of relational algebra queries, and sixty percent of graph pattern queries are boundedly evaluable. Query plans for boundedly evaluable queries outperform query engines that scale with dataset size by three orders of magnitude. The gap gets larger on bigger data. For example, the results on call detail record (CDR) queries show that bounded evaluation improves ninety percent of a group of sample queries by twenty five times to five orders of magnitude.

Unfortunately, many queries are not boundedly evaluable. Views may be employed to support scale independent searching of queries that are not boundedly evaluable. A view contains an index of extracted data from a database. When employing views, a small set of views of the database are selected. Then an answer to the query in the dataset is determined by querying the selected set of views and/or an additional small fraction of the dataset. Accordingly, a view of the dataset can be cached (e.g., the results of a query applied to the dataset) in memory for fast access. The query of the dataset is then completed by querying the selected views of the dataset, while restricting costly input/output (I/O) operations to a big dataset. Queries that are not boundedly evaluable can be efficiently answered by employing small views and bounded access. To support scale independence using views, techniques are employed for selecting views, indexing views for fast access, and incrementally maintaining the views.

Disclosed herein are mechanisms to support deployment of view based queries. For example, the disclosed mechanisms support characterization of scale independence of the view based queries. As such, the disclosed mechanisms support determining whether a particular query is scale independent based on a set of views and access constraints. More specifically, the disclosed mechanisms apply systematic schemes to make effective use of cached views when querying big data. Stated differently, the disclosed mechanisms allow a system to determine whether a query can be answered by querying a set of views given corresponding access constraints in a manner that is scale independent to the size of the dataset. Specifically, a query and a set of access constraints are received as input to a network device. The device also receives a resource bound. The network device then selects a set of cached views containing results of the query as applied to the dataset. The network device determines that the query is a topped query. To be a topped query, the query elements are covariant and the size of the query elements is smaller than the resource bound. After determining that the query is a topped query, the network device generates a query rewriting plan with a length bounded by the resource bound. The query rewriting plan is then employed to rewrite the query to reference the views instead of the dataset. The query rewriting plan is limited based on the access constraints, which may be cardinality constraints in some example. Further, the query rewriting plan is generated by employing search trees configured to search the cached views according to the rewritten query. For example, the query rewriting plan may have fetch access to the cached data via indices contained in the access constraints. The rewritten query may then be employed to search the cached views and update the results of the query without searching the entire dataset.

Figure 1:
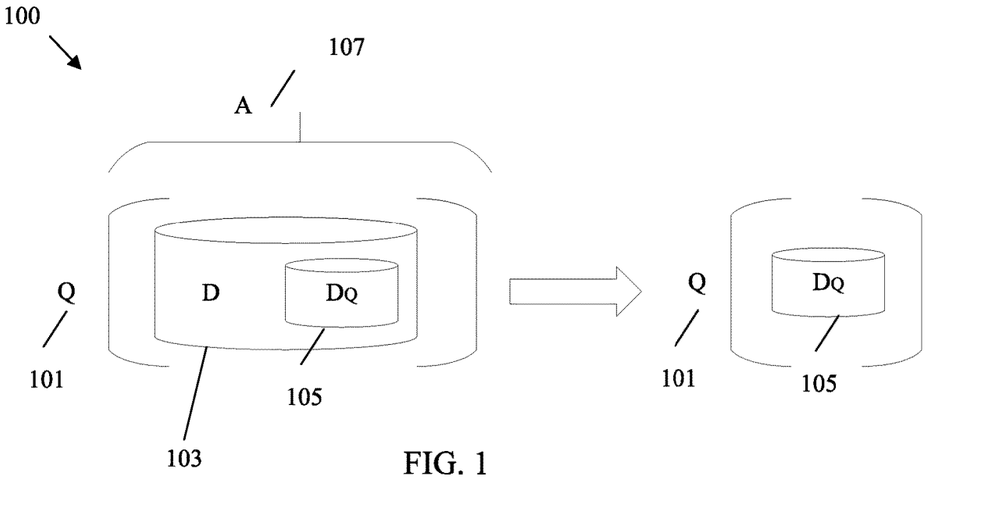
FIG. 1 is an illustration of an example of a boundedly evaluable query.

FIG. 1 illustrates an example 100 of a boundedly evaluable query 101. A query 101 is a structured information request. By way of illustration, a query can be a structured query language (SQL) query. A query 101 can be evaluated against a dataset 103 to obtain information. In general, a dataset 103 is a collection of data stored according to a relational schema. For example, a dataset can be stored in a relational database. In general, a relational schema is an organizational plan than logically relates data in the dataset 103. A set of access constraints 107 can correlate the dataset 103 to a data subset ($D_Q$) 105 by index. In such a case, the query 101 can obtain the same results by searching $D_Q$ 105 as searching the entire dataset 103. First, $D_Q$ 105 can be searched by evaluating the query 101 against $D_Q$ 105. Then, the indices contained in the access constraints 107 can be used to fetch relevant data from the search results. The fetched data is an answer to the query 101. Further, the fetched data is the same answer to the query 101 as would be achieved if the query 101 had been applied directly to the dataset 103. In this scenario, the query 101 is considered boundedly evaluable because the query 101 can be answered by searching a subset $D_Q$ 105 of the dataset 103. Further, the subset $D_Q$ 105 is of a size that is not directly related to the size of the dataset 103. Hence, the search time of the boundedly evaluable query 101 is dependent on the scale of subset $D_Q$ 105 and not the scale the dataset 103. Accordingly, the search time of the boundedly evaluable query 101 is independent of the size dataset 103, which renders the boundedly evaluable query 101 scale independent. The following is an example query 101, referred to herein as Example 1, which is boundedly evaluable because the access constraints 107 support the identification of a subset $D_Q$ 105 of a dataset 103.

In this example, query 101 is a graph search query of a social media website. A graph search query is a query that searches data organized into a graph by checking and/or updating vertexes of the graph. The example query 101 directs a search engine to search a dataset 103 for all restaurants in New York City at which a user has not dined, but social media friends of the user have dined in May of 2015. An access constraint 107 on the social media platform is that a user can have at most 5,000 social media friends. The access constraint 107 allows the search engine to determine a subset $D_Q$ 105 of a dataset 103, because the total number of social media friends to be searched (e.g., subset $D_Q$ 105) does not scale with the total number of users of the social media platform (e.g., the dataset 103). In this case, the query 101 can be answered by accessing a maximum of 47,000 tuples instead of billions of user tuples and trillions of friend tuples in the social media platform's dataset. As such, the access constraint 107 renders the query 101 boundedly evaluable.

Unfortunately, many queries are not boundedly evaluable. Specifically, for a query 101 to be boundedly evaluable, the access constraints 107 must allow the query 101 to determine the searchable subset $D_Q$ 105. When the access constraints are insufficient to narrow the dataset 103 into a subset $D_Q$ 105, the query 101 is not boundedly evaluable and the entire dataset 103 is searched to obtain the results to the query. In this case, the speed of the query 101 would be dependent on the size of dataset 103, and hence not scale independent. The following is an example query 101, referred to herein as Example 2, which is not boundedly evaluable because the access constraints 107 do not support the identification of a subset $D_Q$ 105 of a dataset 103.

In this example, query 101 directs the search engine to find movies that were released by Movie Studio in 2014, were liked by people working at Government Agency, and were rated at five stars. The query 101 is defined over a relational schema (Ro) including four relations. The first relation is person (pid, name, affiliation), indicating a person is related to a personal identifier (pid), a name, and an affiliation indicating the person's workplace. The second relation is movie (mid, mname, studio, release), indicating a movie is related to a movie identifier (mid), a movie name, a movie studio, and a release date. The third relation is rating (mid, rank), indicating a rating is related to a movie identifier and a movie rank, such as one to five stars. The fourth relation is like (pid, id, type), indicating that a like is related to a personal identifier, an item identifier (id), and a type of like that includes but is not limited to movies. In such a case, the example query 101, denoted as Qo, as discussed above over the schema Ro can be written as a conjunctive query: Qo(mid)=∃ $x_p$, $x'_p$, $y_m$ (person($x_p$, $x'_p$, "Government Agency") ∧ movie(mid, $y_m$, "Movie Studio", "2014") ∧, like($x_p$, mid, "movie") ∨, and rating(mid, 5)). A pair of access constraints 107, denoted as Ao, may be applied. Stated as a conjunctive, a first access constraint (a) is φ1=movie((studio, release)→mid, NO), which indicates that each studio releases at most NO movies each year, where NO (≤100) is obtained by aggregating instances across the schema Ro. The example access constraint 107 provides an index of movies such that given a (studio, release) value, the index returns at most NO corresponding movie identifiers. A second access constraint (b) is φ2=rating(mid→rank, 1), which indicates that each movie has a unique rating and an index is based on rating that can be employed to fetch the rank of a corresponding number of movie identifiers. Under the access constraint 107 Ao, query 101 Qo is not boundedly evaluable. Specifically, the access constraints 107 provide limitations for the number of movie tuples and the number of rating tuples. However, the access constraint 107 does not limit the number of person tuples or the number of like tuples to a subset of the entire dataset 103. In this case, the providing an answer to query 101 involves searching potentially billions of person and like tuples over the scheme Ro and not access constraints 107 to identify a bounded fraction of such tuples to answer the query 101.

In order to solve this issue, views are employed to allow searching of queries, such as the example above, that are not boundedly evaluable while still providing scale independence. Specifically, a view is a cached subset $D_Q$ 105 of a dataset 103. A view is created by evaluating a query 101 against the entire dataset 103 and storing the results in the subset $D_Q$ 105. When a query 101 can be rewritten to search one or more views stored as cached subsets $D_Q$ 105, the query 101 is necessarily scale independent because the size of the cached subsets $D_Q$ 105 is not related to the size of the dataset 103. Such query rewriting allows the query 101 to be scale independent even when the access constraints 107 do not result in a query 101 that is boundedly evaluable. Query rewriting is accomplished by employing query rewriting plans as discussed below with respect to FIG. 2.

Defined formally, a relational schema (R) employed to store a dataset 103 that includes a collection of relation schemas 1-$n$ (R1, ..., Rn). Each relational schema includes a fixed set of attributes. The dataset 103 may include a countably infinite domain (U) of data values, on which instances of the dataset over the relational schemas are defined. This size of the dataset, which is measured as the total number of tuples in the dataset is denoted herein as |D|. Further, an access schema (As) over a database schema R includes a set of access constraints 107 defined by φ=R (X→Y, N), where φ are the access constraints for the relation schema, R is the relation schema, X and Y are sets of attributes of R, and N is a natural number. An instance of the dataset 103 applied to database schema R satisfies the access constraints 107 φ when the following are true. First, for a X-value in the dataset, |Dy(X=a)|≤N, where Dy(X=a) is the set {t[Y]|t∈D}, t[X]=a. Accordingly, there exists an index a for a X value that fetches less than N Y values, where the Y values and the X values are both included in the dataset. Second, there exists a function (e.g., index) that given an X-value a, the index can be employed to return Dy(X=a) from the dataset in O(N) time, where O(N) indicates a linear processing time in big O notation. An access constraint 107 is a combination of a cardinality constraint and an index on X for Y (e.g., the function correlating X to Y). The access constraint indicates that a specified X-value, there exist at most N distinct corresponding Y-values. Further, these Y values can be efficiently fetched by using the index as they can be fetched in O(N) time. For example, the access constraints that resulted in a boundedly evaluable query are such an access schema.

It should be noted that functional dependencies (FDs) are a special case R(X→Y, 1) of access constraints 107, where a bound N=1, when an index is built from X to Y. Access constraints 107 can be discovered from instances of the relational schema R, by extending mining tools for FDs with aggregates. An instance of dataset D of relational schema R satisfies access schema A, denoted by D⊨A, when D satisfies all the constraints in A.

Further, queries 101 and views are expressed in the same query language (£). For example, queries 101 and views may be expressed as conjunctive queries (CQ), unions of conjunctive queries (UCQ), positive existential first order logic queries, and/or first order logic queries (FO). A conjunctive query is built up from relation atoms R(x) where the relational schema is included in the set of relational database schemas and equality atoms x=y or x=c, and where c is a constant. The conjunctive query is also closed under conjunction $\wedge$ and existential quantification $\exists$. Unions of conjunctive queries take the form of $Q=Q_1 \cup \ldots \cup Q_k$, where $Q_i$ is a conjunctive query for an index (i) included in the set of 1-k. Positive existential first order logic queries, are built from relation atoms and equality atoms by closing under conjunction $\wedge$, disjunction $\vee$ and existential quantification $\exists$. First-order logic queries are built from atomic formulas by closing them under conjunction $\wedge$, disjunction $\vee$, negation $\neg$, existential quantification $\exists$, and universal quantification $\forall$.

Figure 2:
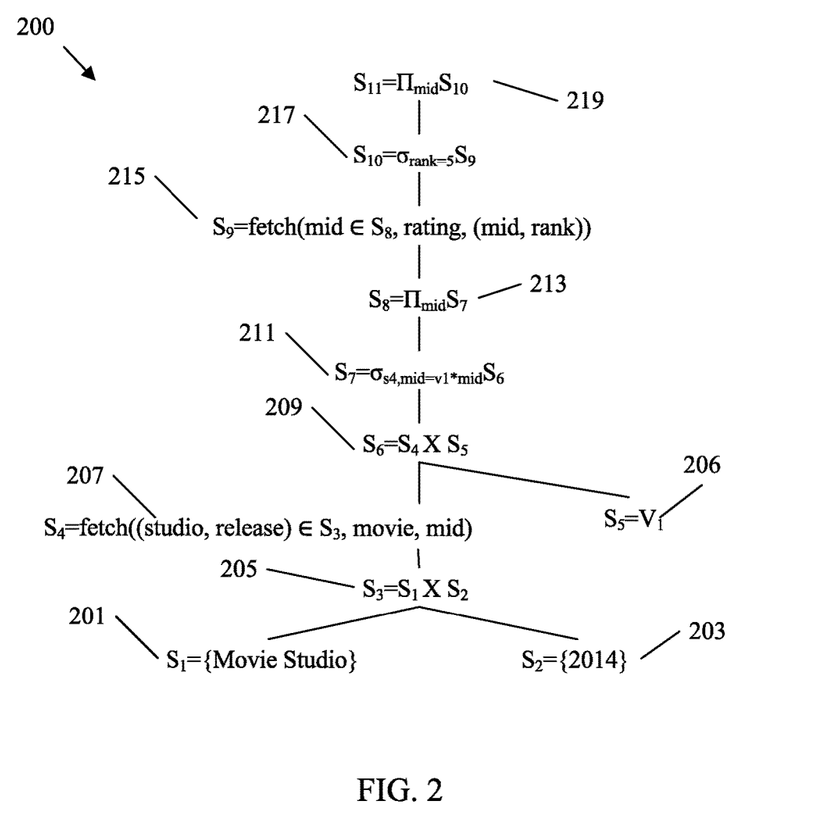
FIG. 2 is a schematic diagram of an example query rewriting plan according to an embodiment.

FIG. 2 is a schematic diagram of an example query rewriting plan 200 according to an embodiment. A query rewriting plan 200 can be employed to rewrite a query, such as query 101, to search a cached view containing a subset of a dataset, such as $D_Q$ 105, instead of searching an entire dataset, such as dataset 103. This can be accomplished even when access constraints are not sufficient to make the query boundedly evaluable. A query rewriting plan 200 is an evaluation plan for a query Q using a set V of views, both defined over a database schema R. To simplify the definition, Q may be written in relational algebra with a projection Π, a selection σ, a Cartesian product x, union u, set difference \ and renaming ρ. A query rewriting plan 200 for a query Q using views V over a database schema R can be denoted by as ε(Q, V, R) and be expressed as a tree Tε, as shown in FIG. 2, that satisfies several conditions as discussed below.

First, each node u of tree Tε is labeled $S_i = \delta_i$ where $S_i$ denotes a relation for partial results, and $\delta_i$ is defined according to several conditions (a)-(e) as follows. For condition (a), {c} is a constant in a query Q, that is employed when u is a leaf of Tε. For condition (b) a view V is included in the set of views when u is a leaf of Tε. For condition (c) fetch(X∈Sj, R, Y) is employed when n has a single child v labeled with $S_j = \delta_j$, and $\delta_j$ has X attributes. For condition (d) $\Pi_y(S_j)$, $\sigma_c(Si)$ or $\rho(Sj)$ is employed when u has a single child v labeled with $S_j = \delta_j$. Y is a set of attributes in $S_j$, and C is a condition defined on Sj. For condition (e) $S_j \times S_1$, $S_j \cup S_1$ or $S_j \setminus S_z$, when u has two children v and v' labeled with $S_j = \delta_j$ and $S_1 = \delta_1$, respectively.

For example, given an instance of a dataset D over a relational schema R, relations $S_i$'s are determined by $\delta_i$, in from a leaf to root fashion to generate a tree Tε. Stated more generally, $\delta_i$ may (a) extract constants from query Q, (b) access cached views V(D), and (c) access dataset D via a fetch operation. The database fetch operation, for each a∈Sj, retrieves Dxy (X=a) from dataset D. Further, relational operations (d) and (e) may also be employed. Further, relation $S_n$ is associated with the root of tree Tε and is the result of the determination.

Second, for each instance a dataset D over a relational schema R, the result ε (D) of applying ε (Q, V, R) to dataset D is the relation Sn at root of Tε as determined above. The rewriting plan applied to the dataset should result in a query over a view that provides equivalent answers as the query over the dataset or, more formally, ε (D)=Q(D). The size of plan tε is the number of nodes in Tε. As used herein $D_Q$ denotes the bag of all tuples fetched for computing the rewritten query over the dataset (D). $D_Q$ is the multiset that collects tuples in Dxy(X=a) for all fetch(X∈Sj, R, Y) when applying the tree Tε to the dataset D. Further, $D_Q$ measures the amount of I/O operations to access the dataset D.

Based on the information above, query rewriting plan 200 depicts an example query rewriting plan $ε_0$ ($Q_0$, $V_1$, $R_0$) for rewriting query Qo of Example 2 onto a view $V_1$ of a dataset D over a relational database schema $R_0$. At step 201, the set of all movies by Movie Studio are considered as $S_1$. Then, at step 203, the set of all movies released in the year 2014 are considered as $S_2$. At step 205, the queries of $S_1$ and $S_2$ are related by relational algebra, as a Cartesian product, as the set $S_3$. This can be accomplished according to the relation movie (mid, mname, studio, release) which is part of the database schema $R_0$. At step 207, the set $S_4$ of movie identifiers of all movies released by Movie Studio in 2014 are fetched according to condition (a). The fetch employs constants, Movie Studio and 2014, as supplied in the query Qo. At step 206, a cached view of the dataset that contains movies liked by people working at Government Agency is obtained as $S_5$ from the view as $V_1$ (D). The set $S_4$ of movie identifiers is then filtered by movie identifiers in $V_1$ (D). At step 209, $S_6$ is determined as the Cartesian product of the set $S_4$ of movie identifiers fetched for Movie Studio in 2014 and the set $S_5$ from the view of $V_1$ containing movies liked by people working at Government Agency. At step 211, a selection is performed on the movie identifiers contained in $S_6$, which results in $S_7$. At step 213, a projection of movie identifiers is taken from set $S_7$ which results in set $S_8$. Thus, steps 209, 211, and 213 cause $S_4$ to be filtered via a join, to obtain a subset $S_8$ of $S_4$ of movies released by Movie Studio in 2014 and also liked by people working at Government Agency. At step 215, rating tuples are fetched using the movie identifiers of $S_8$, resulting in $S_9$ Then the set $S_{11}$ of movie identifiers is found, which answers the query applied to the dataset while only applying the query to the view of the dataset. Specifically, at step 217, a selection is applied to $S_9$ to determine movie identifiers with a rank of five, resulting in $S_{10}$. Then, at step 219, a projection is employed to determine the movie identifiers from $S_{10}$, resulting in $S_{11}$.

Accordingly, the remapped query results in $S_{11}$, which contains the movie identifiers for movies that were produced by Movie Studio in 2014, are liked by people working at Government Agency, and are rated as five stars. In summary, the query rewriting plan 200 takes a first set of relationships from a query, selects a view containing a second set of relationships from the query, fetches the common elements from the view for both relationships, and then fetches further relationships from the query, as desired, out of the common elements fetched from the view. As a result, only the view is searched, the entire dataset is not searched, and the results are the same as the results that would have been returned if the entire dataset had been searched. Accordingly, query rewriting plan 200 takes a query that is not boundedly evaluable, rewrites the query to search a view, and provides results that are determined in a manner that is scale independent of the size of the dataset.

To formalize bounded query rewriting, access schemas and a bound on the size of query plans are employed. Consider an access schema A defined over relational database schema R. A query rewriting plan ε (Q, V, R) conforms to access schema A when (a) for each fetch(X∈Sj, R, Y) operation in tree Tε there exists an access constraint R(X→Y', N) in the access schema A such that Y is a subset of the union of X and Y' or Y⊆XUY', and (b) there exists a constant $N_Q$ such that for all instances of the dataset D over the relational schema R that satisfy access constraints A, where the total number of tuples in the data subset $|D_Q|$ is less than or equal to the constant $N_Q$. While the query rewriting plan ε can access entire cached views, the plan's access to the underlying dataset D should be via fetch operations only. Further, the query rewriting plan ε should employ the fetch operations by making use of the indices in the access constraints A. Plan ε determines how to retrieve a data subset $D_Q$ from dataset D such that the query of the dataset Q(D) is computed by using the data in the data subset $D_Q$ and a view of the dataset V(D) only. Further, $D_Q$ is bounded. Hence, the total number of tuples in the data subset $|D_Q|$ is independent of the total number of tuples in the dataset $|D_Q|$. The time for identifying and fetching $D_Q$ is also independent of the total number of tuples in the dataset $|D_Q|$. This presumes that given an X-value a, the search engine takes O(N) time to fetch Dxy(X=a) from D via the index for R(X→Y, N).

Given a natural number M to act as a bound/threshold, a query rewriting plan ε (Q, V, R) is an M-bounded plan for the Q using a view V under access constraints A when the plan ε conforms to the access constraints A, and when the size of the plan ε is at most the natural number M. The size of the plan indicates a length of the plan in terms of a number of total plan operations (e.g., fetch from the dataset operations or access cached view operations). By setting a maximum size of the plan to a bound M, the system can prevent generation of an unnecessarily long and detailed plan that would tax system resources when a shorter more general plan is sufficient for the task based on available system resources. A bound M, and hence a maximum rewriting plan size/length, may be selected by a user, may be predefined, and/or may be determined based on available resources. Fewer available resources employ a smaller bound M, and greater available resources allow for a larger bound. Without the bound M, a rewriting plan ε may become of exponential length when applied to real-life data, which creates implementation difficulties. Specifically, algorithmically determining a bound M for a bounded rewriting even for a conjunctive query may be considered EXPSPACE-hard, where EXPSPACE-hard indicates the determination of the bound M by reduction from the problem for deciding bounded evaluability for the conjunctive query is among the most computationally complex problems in the set of all decision problems. Hence, user selection of bound M based on resources is a reasonable implementation. When a query rewriting plan ε (Q, V, R) is M-bounded under the access constraints A, then for all datasets D that satisfy the access constraints A, the query Q over dataset D can be efficiently answered by following the plan tree ε and accessing a bounded amount of data from the dataset D (e.g., via fetch operations and not by searching).

The example query rewriting plan 200 shown in FIG. 2 has a bound M of eleven for query Qo using view V1 under Access constraints Ao. Both fetch operations at steps 207 and 215 are controlled by the access constraints Ao. Further, for an instance of a dataset D over relational schema Ro, the plan ε accesses at most 2N0 tuples from dataset D, where N0 is the constant in φ1 of access constraint Ao. This is because the number of tuples $|S_4|$ fetched at step 207 is less than or equal to the constant N0 by φ1; the number of tuples $|S_9|$ fetched at step 215 is less than or equal to the constant N0 by $S_8⊆S4$ and constraint φ2 on rating in access constraint Ao; and eleven operations are conducted in total. The rating tuples in dataset D are fetched by using $S_8$, which is obtained by relational operations on the view of the dataset V1 (D) and $S_4$. While view V1 is not boundedly evaluable under access constraint Ao, the amount of data fetched from dataset D is independent of the number of tuples in the dataset |D|.

As such, bounded query rewriting can be formalized. For example, a query Q may be written in a language L with a set of L definable views V and an access schema A, all of which are applied over the same database schema R. For a bound M, the query Q has an M-bounded rewriting in language L using views V under access constraints A. Accordingly, the query Q has an M-bounded rewriting over views V when bound M and access constraints A are clear from the context. This holds true when the query has an M-bounded query plan ε (Q, V, R) under access constraints A such that plan ε is a query plan in language L (e.g., in each label of partial results $S_i=\delta_i$ of plan ε) under the following conditions. When the language L is for a conjunctive query, $\delta_i$ is a fetch, a projection Π, a selection σ, a Cartesian product x, a renaming ρ. When the language L is for a union of conjunctive queries, $\delta_i$ can be a fetch, a projection Π, a selection σ, a Cartesian product x, a renaming ρ, or a union u. Further, for a node labeled as a union u, the node's ancestor nodes in the tree Tε of plan ε are also labeled with a union u. For unions of conjunctive queries union u may be conducted at the top level only. When the language L is for a positive existential first order logic query, then $\delta_i$ can be a fetch, a projection Π, a selection σ, a Cartesian product x, a renaming ρ, or a union u. When the language L is for a first order logic query, $\delta_i$ can be a fetch, a projection Π, a selection σ, a Cartesian product x, a renaming ρ, a union u, or set difference \. Further, if a plan ε is written in a language L, then there exists a query Qε in the language L such that, for all instances of the dataset D of relational schema R, ε(D)=Qε(D). Further, the size |Qε| of the rewritten query Qε is linear in the size of query rewriting plan ε. Such query Qε is unique up to equivalence. Accordingly, Qε is referred to as the query expressed by the plan ε.

For example, the conjunctive query $Q_0$ of Example 2 has an 11-bounded rewriting using view V1 under Access constraint Ao. Specifically, query rewriting plan 200 of FIG. 2 is a bounded query rewriting plan that converts the query $Q_0$ over the view V1 into the rewritten query Qε (mid)= ∃ $y_m$ (movie(mid, $y_m$, "Movie Studio", "2014") ∧$V_1$(mid) ∨ rating(mid, 5)).

Next, an effective syntax is discussed for first order logic queries that have a bounded rewriting. For a database relational schema R, views V, access schema A, and bound M, two classes of first order logic queries can be determined. The first is a class of queries topped by (R, V, A, M), which covers (e.g., includes) all first order logic queries defined over relational schema R that have a M-bounded rewriting using views V under access schema A up to A-equivalence. The second class are size-bounded queries, which covers (e.g., includes) all the views V in the first order logic queries that have bounded output for all instances of relational schema R that satisfy access constraints A. The second class checks bounded output when deducing topped queries. As discussed below, a search engine can check whether a query is topped or size-bounded is in polynomial time.

It should be noted that, for a relational schema R, view V and bound M, and under access constraints A, each first order logic query Q with an M-bounded rewriting using view V is access constraint A-equivalent to a query topped by (R, V,A, M). Further, every first order logic query topped by (R, V, A, M) has a M-bounded rewriting as a first order logic query using view V under access constraint A, which can be identified in polynomial time based on bound M, number of query tuples |Q|, number of view tuples |V|, and number of access constraint tuples |A|. Further, a system takes polynomial time in bound M, number of relational schema tuples |R|, number of query tuples |Q|, number of view tuples |V|, and number of access constraint tuples |A| to check whether a first order logic query Q is topped by (R, V, A, M). This system employs a database search system configured to check whether first order logic query views in V have bounded output in polynomial time in a number of query tuples |Q|.

In this case, access constraints A, query Q, and views V are all defined over the same relational schema R. That is, topped queries are a core sub-class of first order logic queries with a bounded rewriting, which can be efficiently checked. Moreover, the bounded rewriting can also be efficiently generated. Further, for a relational schema R and under access constraints A, each first order logic query Q over relational schema R that has bounded output is A-equivalent to a size-bounded query under access constraints A; each size-bounded query has bounded output under access constraints A; and a system takes polynomial time with a number of query tuples |Q| to check whether a first order logic query Q is a size-bounded query. Here access constraints A and query Q are defined over the same relational schema R. The foregoing demonstrates the existence of effective syntax for first order logic queries with bounded rewriting. There are other forms of effective syntax for such first order logic queries.

Capitalizing on the effective syntax, systems can be employed to check whether a specified first order logic query Q is topped by (R, V, A, M) in polynomial time. If so, the system can generate a bounded query plan ε for the query Q using views V. Bounded rewriting can be achieved by employing a database management system as follows. Specifically, an application, a database relational schema R, and a resource bound M are first determined, for example based on the application and available resources, respectively. For example, a bound may be set as a predefined integer multiple of available CPU cores to be employed for generating and applying the query rewriting plan. A bound may also be set based on a maximum desirable query rewriting plan generation time, for example as a predefined integer multiple of the maximum query rewriting plan generation time. A bound may also be set directly by a user. For example, the bound may be set as one hundred operations, five hundred operations, a thousand operations, etc. Then, a set of views V can be selected, and a set of access constraints A can be determined. After these are in place, a first order logic query Q posed on an instance of dataset D of relational schema R that satisfies access constraints A, can be employed to check whether the query Q is topped by (R, V, A, M). If so, a bounded query plan ε for the query Q using view V is determined by employing the algorithms described above. Then the results of a query of the dataset Q(D) can be determined by employing the query rewriting plan ε with the existing database management system. Moreover, incremental methods for maintaining the views and the indices of access constraints A may be employed in response to updates to the dataset D. By employing these steps, first order queries Q can be efficiently answered in a big dataset D by leveraging bounded rewriting.

Figure 3:
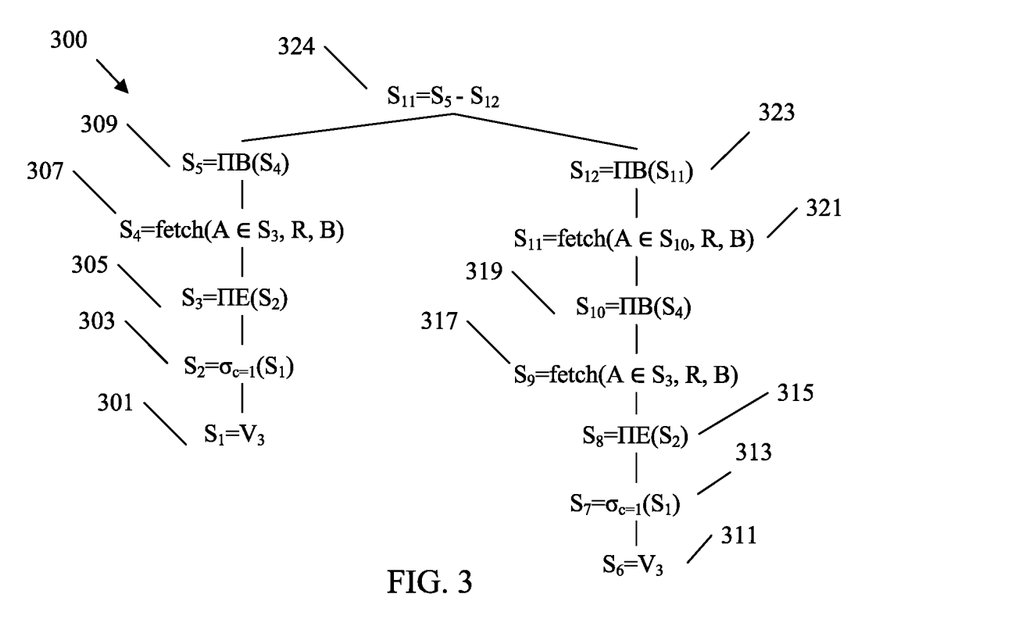
FIG. 3 is a schematic diagram of another example query rewriting plan according to an embodiment.

FIG. 3 is a schematic diagram of another example query rewriting plan 300 according to an embodiment. Query rewriting plan 300 is similar to query rewriting plan 200. Specifically, query rewriting plan 300 can be employed to rewrite a query, such as query 101, to search a cached view containing a subset of a dataset, such as $D_Q$ 105, instead of searching an entire dataset, such as dataset 103. Query rewriting plan 300 is shown to discuss topped queries. Specifically, query rewriting plan 300 can be employed to rewrite a first order logical query as discussed in Example 3 below.

In Example 3, a database schema $R_1$ with two relations R(A, B) and T(C, E) is employed. The dataset employs an access schema $A_2$ including R(A→B,N) and T(C→E,N), and a set of views $V_3$ with a single view $V_3(x,y)=R(y,y) \wedge T(x,y)$. Given a value for x, $V_3$ returns a bounded number of y values due to the access constraint on T. An example first order logical query is then received as follows: $Q_3(z)=Q_4(z) \wedge \neg \exists wR(z,w)$, where $Q_4(z)= \exists x \exists y(V_3(x,y) \wedge (x=1)) \wedge R(y, z)$. In such a case, query $Q_3$ with a bound of thirteen has a 13-bounded rewriting as shown in FIG. 3. After applying query rewriting plan 300 an access constraint A-equivalent query is determined to be $Q_3(z)=Q_4(z) \wedge \neg (Q4(z) \wedge \exists wR(z, w))$.

The query rewriting plan 300 begins by rewriting Q4 onto $V_3$. At step 301, $S_1$ is determined to contain the tuples in the view $V_3$. At step 303, a selection G is taken of value C=1 in $S_1$ resulting in $S_2$. At step 305, a projection H of values E in $S_2$ is taken resulting in $S_3$. At step 307, a fetch operation is employed to select values R,B from $S_3$ that are associated with value A resulting in $S_4$. At step 309, a projection of values B in $S_4$ is employed resulting in $S_5$.

At step 311, $S_6$ is determined to contain the tuples in the view $V_3$. At step 313, a selection σ is taken of value C=1 from $S_1$ resulting in $S_7$. At step 315, a projection Π of values E in $S_2$ is taken resulting in $S_8$. At step 317, a fetch operation is employed to select values R,B from $S_3$ that are associated with value A resulting in $S_9$. At step 319, a projection of values B in $S_4$ is employed resulting in $S_{10}$. At step 321, a fetch operation is employed to select values R,B from $S_{10}$ that are associated with value A resulting in $S_{11}$. At step 323, projection of values B in $S_{11}$ is employed resulting in $S_{12}$. Finally, at step 324 a difference between set $S_5$ and $S_{12}$ results in $S_{11}$.

It should be noted that query Q becomes bounded because z-values are propagated from Q4 to $\neg \exists wR(z,w)$. Such propagated values are bounded data to be fetched for relation atoms, such as R(z,w). It should also be noted, the part of the query rewriting plan 300 for a sub-query of Q3 may have to embed the part of the plan for another sub-query. For instance, Q4 has a 5-bounded rewriting in Q3 shown as steps 301-309. In addition, $\exists wR(z,w)$ has a 7-bounded rewriting in Q3 as shown in steps 311-323. This embeds the 5-bounded plan for Q4. Further, the size of the plan for Q3 is the sum of the sizes of plans for Q4 and $\exists wR(z,w)$, which results in a total bound of thirteen by including a five bounded rewriting plus a seven bounded rewriting and a one bounded rewriting to combine them. This shows that to cover queries such as Q3, topped queries support value propagation among sub-queries, and keep track of the sizes of plans for sub-queries.

Based on the above, a covariance function is defined to determine value propagation and a size function is defined to track the size of plans for sub-queries. A Boolean covariance function $cov(Q_s(x),Q(z))$ is employed to ensure that when $Q_s(x)$ has a bounded rewriting and $cov(Q_s(x), Q(z))=true$, then $Q_s(x) \wedge Q(z)$ also has a bounded rewriting. A size function $size(Q_s(x), Q(z))$ is employed to determine a natural number, which is an upper bound of the size of minimum sub-plans for a sub-query Q(z) in $Q_s(x) \wedge Q(z)$. The intuition behind these functions is as follows. Q(z) indicates a (sub-) query being inspected, and $Q_s(x)$ keeps track of sub-queries from which values are propagated to Q(z), to make Q(z) bounded. Function $cov(Q_s, Q)$ is to check whether values can be propagated from $Q_s$ to Q and achieve a bounded rewriting of Q. For instance, $cov(Q4, \exists wR(w,z))=true$ for Q3 in Example 3, in which Q4 is $Q_s$, and $\exists wR(w,z)$ is Q. This indicates that by propagating values from bounded Q4, a bounded rewriting for sub-query $\exists wR(w, z)$ can be determined. For example $Q_s$ may include views from a view set V. When determining $cov(Q_s, Q)$, views that need to have bounded output are distinguished from those that do not. Further, function $size(Q_s, Q)$ is employed to ensure that query plans do not exceed a specified bound M. In Example 3, $size(Q4, \exists wR(w, z))=7$, which is the size of the plan for evaluating $\exists wR(w, z)$ in Q3 (e.g., steps 311-323) by employing values propagated from Q4.

Topped queries are also defined. A first order logic query Q over relational schema R is topped by (R,V,A,M) if $cov(Q\epsilon,Q)=true$; and $size(Q\epsilon, Q) \leq M$. Accordingly, a query is a topped query when the query plan is covariant to the query and the size of the query is less than or equal to the lower bound. Here Qε is a tautology query such that for a Q, $Q\epsilon \wedge Q=Q$ and Qε has a 0-bounded plan. Accordingly, determining $cov(Q_s, Q)$ and $size(Q_s, Q)$ starting with $Q_s=Q\epsilon$, and conclude that Q is topped by (R,V, A, M) when the two conditions above are satisfied. The covariance and size functions are defined inductively based on the structure of a first order logical query Q. In the process, a bounded query plan is generated. As such, if $cov(Q_s(x), Q(z))=cov(Q\epsilon, Q_s(x))=true$ and $Q_s(x)$ has a $size(Q\epsilon, Q_s(x))$-bounded rewriting, then $Q_s(x) \wedge Q(z)$ has a $size(Q\epsilon, Q_s(x) \wedge Q(z))$-bounded rewriting.

Size-bounded queries are also defined herein. An first order logical query Q(x) is size-bounded under an access schema A if it is of the following form: $Q(x)=Q'(x) \wedge \forall_{x1}, \ldots, x_{K+1}(Q'(x_1) \wedge \ldots \wedge Q'(x_{k+1}) \rightarrow V_{i,j \in [1,K+1], i \neq j} x_i = x_j)$, where K is a natural number bound, V is a view, i and j are indices, x is a variable, and Q' is a first order logical query. A first order logical query Q'(x) has bounded output under access constraints A when there exists a bound k such that Q' (x) is A-equivalent to Q(x) of the form above, which explicitly states that Q' (x) has at most k distinct answers for a constant k. It should also be noted that a first order logical query is size bounded as long as the query of the dataset contains less than or equal to k tuples. In such a case, the query Q has a bounded output. By the definition of size-bounded queries, syntactically checking whether a first order logical query Q is size bounded is an operation that takes polynomial time based on the size of the number of query tuples |Q| the query Q.

The present disclosure has formalized bounded query rewriting using views under access constraints as well as provide an effective syntax for first order logical queries with a bounded rewriting, along with an effective syntax for first order logical queries with bounded output. It should be noted that additional supporting proofs and complexity studies are included in "Bounded Query Rewriting Using Views" by Yang Cao, the teachings and disclosures of which are hereby incorporated in their entireties by reference thereto.

Figure 4:
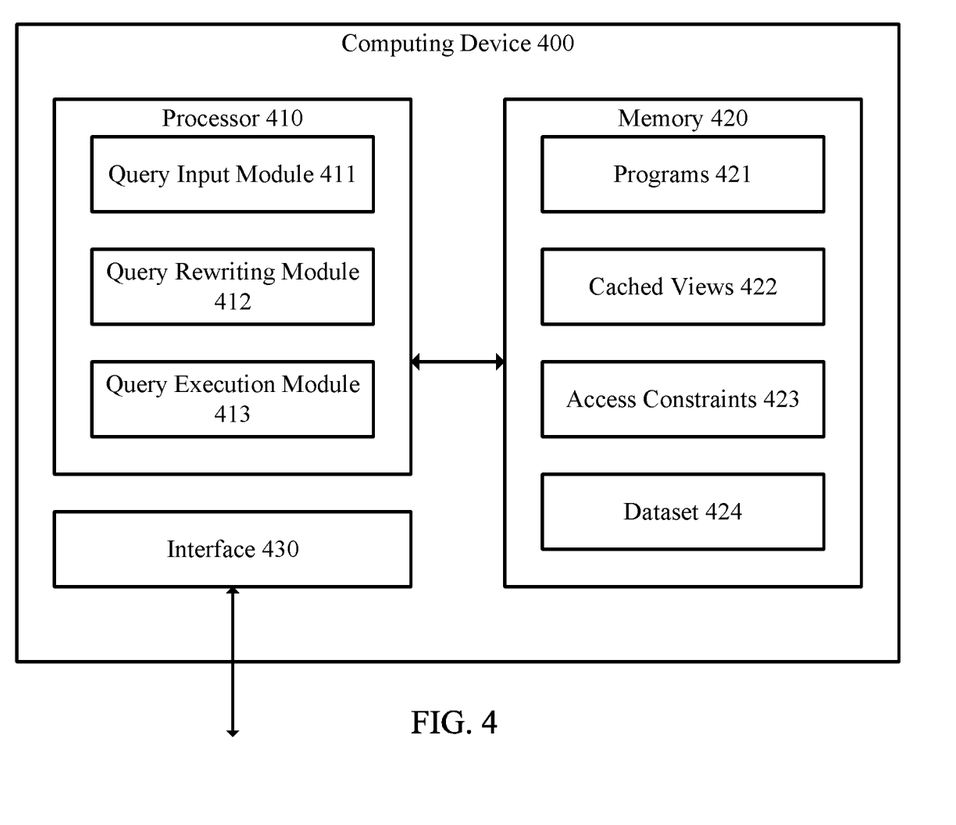
FIG. 4 is a schematic diagram of an example computing device for bounded query rewriting according to an embodiment.

FIG. 4 is a schematic diagram of an example computing device 400 for bounded query rewriting according to an embodiment, such as network device, a server, a cloud computing node, or other computing device configured to execute a query, such as query 101 over a dataset 103 and/or a data subset 105. For example, computing device 400 may be employed to generate a query rewriting plan, such as query rewriting plan 200, 300, or query rewriting trees operative to rewriting a query onto a cached view. Computing device 400 may also implement method 500 and/or other system, device, method, mechanism, or other item(s) disclosed herein. One skilled in the art will recognize that the term computing device encompasses a broad range of devices of which computing device 400 is merely an example. Computing device 400 is included for purposes of clarity of discussion, but is in no way meant to limit the application of the present disclosure to a particular computing device embodiment or class of computing device embodiments. For instance, the features/methods in the disclosure may be implemented using hardware, firmware, and/or software installed to run on hardware. The computing device 400 may be a device that generates and/or executes search queries over a dataset stored in memory. As shown in FIG. 4, the computing device 400 includes at least a memory 420, a processor 410, and/or one or more interfaces 430.

The memory 420 may include read only memory (ROM), random access memory (ROM), cache memory, registers, solid state memory, flash memory, and/or other memory device or devices that functions as a data store. The memory 420 may include stored programs 421, such as computer program products, that when executed, cause the computing device 400 to perform the mechanisms disclosed herein as well as other computing tasks. For example, the memory 420 acts as non-transitory computer readable medium, and the stored programs 421 may comprise a computer program product for use by computing device 400. Such a computer program product includes computer executable instructions stored on the non-transitory computer readable medium such that when executed by a processor, cause the computing device to perform related steps. The memory 420 may also include access to a dataset 424, which may be similar to a dataset 103 stored according to a relational schema, access schema, etc. It should be noted that in some examples, the dataset 424 may be stored in whole or in part on other network devices, such as webservers. In such a case, the portions of the dataset 424 may be accessed via a network interface, such as interface 430, for example via fetch operations as discussed above. The memory 420 may also include cached views 422. As discussed above, a cached view 422 contains a subset of the data contained in dataset 424. For example, the cached views 422 may contain tuples or other data returned as the result of a query. Such tuples/ data are stored for fast access to allow the computing device 400 to access such data without searching through the dataset 424. The cached views 422 are scale independent of the dataset 424. As such, a process that allows the computing device 400 to search the cached views 422 instead of the dataset 424 potentially significantly increases the speed of computing device 400, especially when the dataset 424 contains big data. As used herein big data is an arbitrarily large dataset that is stored for the purposes of analysis to determine patterns, trends, or other associations related to human behavior. The memory 420 may also store access constraints 423. Access constraints 423 are cardinality constraints that include indices that associate data in a dataset 424. As noted above, access constraints 423 may be employed to fetch specific data from a cached view 422 and/or a dataset 424 without searching.

The processor 410 is coupled to the memory 420 and may comprise one or more single core and/or multi-core processors. The processor 410 may be implemented as a general processor, one or more application specific integrated circuits (ASICs), field programmable gate arrays (FPGAs), microcontrollers, digital signal processors (DSPs), etc. The computing device 400 may comprise a query input module 411, a query rewriting module 412, and/or a query execution module 413. In alternative embodiments, modules 411, 412, and/or 413 may be implemented in processor 410, as instructions stored in memory device 420 (e.g., as a computer program product in programs 421), which may be executed by processor 410, and/or implemented in part in the processor 410 and in part in the memory device 420. The query input module 411 is configured to obtain a query for execution over a dataset 424. Such query can be received from a user, be programmed to execute periodically, etc. As noted above, operating the query over the dataset 424 can consume significant time and processor resources when the dataset 424 is large. The query rewriting module 412 is configured to rewrite the query from the query input module 411 to search the cached view 422 instead of the dataset 424. For example, the query rewriting module 412 may determine a query rewriting plan, such as query rewriting plan 200 and/or 300 and convert the query of the dataset 424 into a query of the data subset stored in the cached views 422. This allows the cached views 422 to be searched. In some examples, the dataset 424 is only accessed via fetch commands which obtain specific data via indices stored in the access constraints 423. This prevents the dataset 424 from being searched by a query rewritten by the query rewriting module 412 and significantly increases the speed and efficiency of the computing device 400 over systems that search an entire dataset each time a query is entered. The query execution module 413 is configured to execute queries over dataset 424 or execute queries over the cached views 422 when such queries are rewritten by the query rewriting module 412. Accordingly, the query input module 411, a query rewriting module 412, and/or a query execution module 413, in conjunction with the memory 420, may be configured to implement the methods, systems, mechanisms, and/or other items disclosed herein.

The computing device 400 also includes an interface 430. The interface 430 may include human interface devices such as a monitor, speaker, touchpad, mouse, trackball, etc. The interface 430 may also comprise transceivers (Tx/Rx), which may be transmitters, receivers, or combinations thereof. A Tx/Rx may be coupled network ports for transmitting and/or receiving data from other network devices over a wired or wireless network. The processor 410 is coupled to the interface 430 and directs the interface 430 to send/receive data from a user and/or to transmit/receive data signals over the network, depending on the example.

Figure 5:
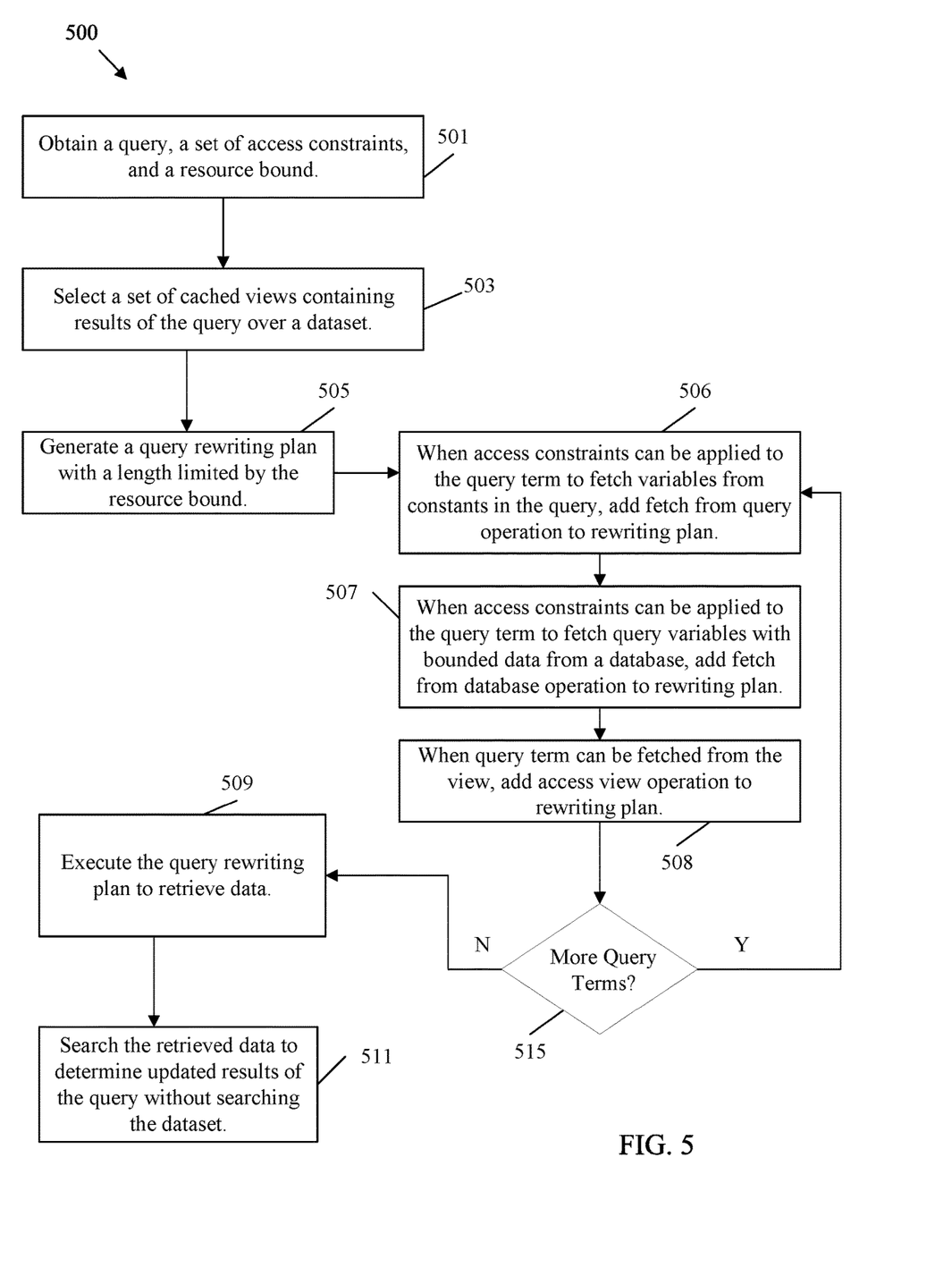
FIG. 5 is a flowchart of an example method of query rewriting using views according to an embodiment.

FIG. 5 is a flowchart of an example method 500 of query rewriting using views according to an embodiment. Specifically, method 500 may be employed to rewrite a query, such as query 101, to search a cached view containing a data subset, such as data subset 105 instead of searching the entire dataset, such as dataset 103. This can be accomplished by generating a query rewriting plan, such as query rewriting plan 200 and/or 300. Further, method 500 may be executed by a computing device, such as computing device 400.

At block 501, a query is obtained. The query may be received from a user and/or obtained from memory. The query as obtained is configured to be executed as a search over a dataset organized over a relational schema. Further, a set of access constraints are also obtained. The access constraints may be received from a user and/or obtained from memory. The access constraints may include cardinality constraints over the relational schema as well as indices. The indices associate data in the dataset based on the relational schema. The indices of the access constraints can be employed to fetch a second group of data associated with a first group of data without employing a search algorithm. In addition, a resource bound is received. The resource bound may be selected by the user or predefined. In either case, the resource bound is selected based on the processing resources to be allocated for query rewriting.

At block 503, a set of cached views is selected. The cached views are stored in memory. The cached views may contain at least some of the results of the query as applied to the dataset, which is stored in a separate database. For example, the cached views may contain tuples returned when the query or a related query is executed over the dataset prior to initiation of method 500. Hence, the cached views contain a subset of the dataset. Further, the cached views contain data (e.g., tuples) sufficient to answer at least a portion of the query received at block 501 when searched. Further, the size of the cached views is unrelated to the size of the dataset. As such, the time to search a cached view is scale independent of the time to search the entire dataset. As the dataset may be quite large, for example when the dataset contains big data, searching the view instead of the dataset is generally significantly faster and requires significantly fewer computing resources. Accordingly a system that searches the cached view(s) and/or a defined subset of the dataset instead of searching the dataset is significantly improved from a computational standpoint and operates in a more efficient manner.

At block 505, a query rewriting plan is generated with a length limited by the resource bound of block 501. As noted above, the size of the plan indicates a length of the plan in terms of a number of total plan operations (e.g., fetch from the dataset operations or access the cached view operations). By setting a maximum size of the plan to a bound M, the system can prevent generation of an unnecessarily long and detailed plan that would tax system resources when a shorter more general plan is sufficient for the task based on available system resources. The query rewriting plan includes one or more search trees for searching the cached views according to a rewritten query. Specifically, operations are iteratively added to the query rewriting plan as nodes in a search tree. For example, the query rewriting plan may be generated by iteratively adding one or more operations for each search term in the query to the search tree. The process of adding the operations is discussed with respect to blocks 506, 507, and 508 below. When the query is a conjunctive query, the query rewriting plan can employ fetch operations, projection operations, selection operations, Cartesian product operations, or renaming operations. When the query is a union of conjunctive queries or a positive existential first order logic query, the query rewriting plan can employ fetch operations, projection operations, selection operations, Cartesian product operations, renaming operations, or union operations. When the query is a first order logic query, the query rewriting plan can employ fetch operations, projection operations, selection operations, Cartesian product operations, renaming operations, union operations, or set difference operations. Specifically, the query rewriting plan rewrites/reorders the terms of the query. The query rewriting plan is generated in a bottom up fashion as discussed above. For example, the query rewriting plan may be generated by determining a set of tuples requested by the query that are contained in one or more of the cached views. Fetch operations can then be employed to obtain additional tuples form the database that are correlated to the tuples obtained from the views. The query rewriting plan may be generated algorithmically, for example by employing guess and check methodologies based on the tuples listed in the query, the tuples available in the views, the access constraints and relations implied by the corresponding indices, and limiting resource bounds.

Blocks 506, 507, 508, and 515 are example sub-blocks that can be employed to generate a query rewriting plan, and hence can be employed to implement block 505. For example, an algorithm for generating a query rewriting plan may iterate through blocks 506, 507, 508, and 515 for each search term and/or each sub-portion of a search term in the query received at block 501. At block 506, the method 500 checks whether there exists an access constraint in the access schema that can be applied to the query term, where the access constraint would allow the query rewriting plan to fetch corresponding variables in the query rewriting plan from constants in the query. When this occurs, a fetch from query operation is added to the query rewriting plan based on the access constraints. A fetch from query operation is an operation that employs an access constraint to fetch a constant from the query to act as a rewritten query variable in the query rewriting plan. As a particular example, step 201 and step 203 in FIG. 2 are constants that are obtained directly from the underlying query and placed into the query rewriting plan as variables. A fetch from query operation obtains the constant from the query term, and hence creates a node in the query rewriting plan that can employ an access constraint, such as an index, to fetch specific data from the dataset without directly applying the query to the dataset. When this condition occurs, the fetch from query operation is employed for the corresponding term in the query and then block 506 is applied to the next search term in the query. Otherwise, the method 500 proceeds to block 507.

As an example, block 507 may be employed when block 506 is unable to obtain the relevant data directly from the query. Block 507 attempts to obtain a bounded set of data from the dataset in the database by employing query variables/constants from the query and corresponding indices. Data is bounded when a computational time cost of an incremental algorithm to obtain the data can be expressed as a polynomial function of the changes to the dataset since the last query and as a function of the query. Specifically, when data at particular nodes in a dataset change, such changes may propagate to adjacent nodes. Data can be considered bounded when changes impacting specified nodes in the dataset (e.g., since the query was run) can be determined by examining the changed nodes and neighbor nodes to the changed nodes within a predetermined number of hops. The number of hops may be received from the user and/or predefined as part of the resource bound in some examples. In an example, a fetch from database operation is added to the query rewriting plan when there exists an access constraint in the access schema that can be applied to fetch query rewriting plan variables from constants and fetched variables in the query, such that the variables have bounded output over databases conforming to the access schema. A fetch from database operation is an operation that fetches a query variable/constant that in turn fetches bounded data from the database via an access constraint. Accordingly, block 507 adds a fetch from database operation to the query rewriting plan based on the access constraints when a rewritten query variable can be fetched from the query, where the variable obtains bounded data from the database via the access constraints (e.g., via an index). As a particular example, step 207 in FIG. 2 is an example of a query variable/constant that in turn fetches bounded data from the database via an access constraint. When this condition occurs, block 507 adds the fetch from database operation to the query rewriting plan and returns to block 506 for the next iteration on the next query term. When this condition does not occur, the method 500 proceeds to block 508.

As an example, block 508 may be employed when block 506 is unable to obtain the relevant data directly from the query and block 507 is unable to obtain bounded data from the database via a query variable. At block 508, the method 500 determines whether a view can be applied on the query so that query variables are fetched via the cached view(s) of block 503. Accordingly, an access view operation is added to the query rewriting plan when a rewritten query variable can be fetched from the cached view. The access view operation is a fetch operation that obtains data from a cached view that contains stored query results. As a particular example, step 206 in FIG. 2 is an example of a fetch operation that obtains data from a cached view that contains stored query results. When blocks 506, 507, and 508 fail to add an operation to the rewriting plan, the method 500 may indicate that the query has no rewriting plan under the access schema using the views. However, when a block 506, 507, and/or 508 adds an operation to the rewriting plan for a search term for the query, the method 500 proceeds to block 515.

At block 515, the method 500 determines whether the query contains additional terms and/or whether the query rewriting plan has fewer operations that the resource bound. If so, the method 500 returns to block 506 to add more operations to the query rewriting plan. Otherwise, the query rewriting plan is complete, and method 500 proceeds to block 509.

At block 509, the query rewriting plan is employed to retrieve data from the database via the access constrains and from the cached views. For example, executing the query rewriting plan to fetch the retrieved data may include executing a fetch from query operation or a fetch from database operation as discussed in blocks 506 and 507. Such operations employ an index contained in a corresponding access constraint to fetch specific data as indicated by a constant in the query or a bounded set of data indicated by a variable in the query. Further, the query rewriting plan may fetch the retrieved data by executing an access view operation as discussed in block 508. Such operations fetch retrieved data from the cached view. Once the query rewriting plan has been executed and the retrieved data has been fetched, the method 500 proceeds to block 511.

At block 511, the query is executed on the retrieved data to determine updated results to the query without reapplying the query to the dataset. Specifically, the data fetched from the database according to blocks 506 and 507 is bounded to a particular subset of the dataset. Such data contains changes since the last time the query was run over the dataset. As such data is bounded, the data size of the retrieved data is not related to the size of the dataset. Further, the data fetched from the cached views according to block 508 is not related to the size of the dataset. As such, the retrieved data is subset of the dataset and may be significantly smaller than the dataset. The query can be applied to the retrieved data is a shorter timeframe and/or by employing significantly fewer processing resources than would be employed to reapply the query to the entire dataset.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A computer-implemented method comprising:
obtaining a query and access constraints;
selecting a cached view containing results of the query as applied to a dataset stored in a database;
generating a query rewriting plan by:
adding a fetch from query operation to the query rewriting plan based on the access constraints when a rewritten query variable can be fetched from a query constant,
adding a fetch from database operation to the query rewriting plan based on the access constraints when a rewritten query variable can be fetched as a query variable that obtains bounded data from the database, and
adding an access view operation to the query rewriting plan when a rewritten query variable can be fetched from the cached view;
executing the query rewriting plan to fetch retrieved data; and
executing the query on the retrieved data to determine updated results to the query without reapplying the query to the dataset.

2. The computer implemented method of claim 1, further comprising obtaining a resource bound, and limiting a number of operations in the query rewriting plan to the resource bound.

3. The computer implemented method of claim 1, wherein generating the query rewriting plan further comprises iteratively adding operations to the query rewriting plan for corresponding search terms in the query, the operations added as nodes in a search tree.

4. The computer implemented method of claim 1, wherein executing the query rewriting plan to fetch the retrieved data includes executing a fetch from query operation or a fetch from database operation that fetches an index of a corresponding access constraint.

5. The computer method of claim 4, wherein the access constraints include one or more cardinality constraints and one or more indices.

6. The computer implemented method of claim 1, wherein executing the query rewriting plan to fetch the retrieved data includes executing an access view operation to fetch retrieved data from the cached view.

7. The method of claim 2, wherein the query rewriting plan comprises fetch operations, projection operations, selection operations, Cartesian product operations, or renaming operations when the query is a conjunctive query.

8. The method of claim 2, wherein the query rewriting plan comprises fetch operations, projection operations, selection operations, Cartesian product operations, renaming operations, or union operations when the query is a union of conjunctive queries or a positive existential first order logic query.

9. The method of claim 2, wherein the query rewriting plan comprises fetch operations, projection operations, selection operations, Cartesian product operations, renaming operations, union operations, or set difference operations when the query is a first order logic query.

10. A computing device, comprising:
a memory storage comprising instructions; and
one or more processors in communication with the memory storage, wherein the one or more processors execute the instructions to:
obtain a query and access constraints;
select a cached view containing results of the query as applied to a dataset stored in a database;
generate a query rewriting plan by:
adding a fetch from query operation to the query rewriting plan based on the access constraints when a rewritten query variable can be fetched from a query constant,
adding a fetch from database operation to the query rewriting plan based on the access constraints when a rewritten query variable can be fetched as a query variable that obtains bounded data from the database, and
adding an access view operation to the query rewriting plan when a rewritten query variable can be fetched from the cached view;
execute the query rewriting plan to fetch retrieved data; and
execute the query on the retrieved data to determine updated results to the query without reapplying the query to the dataset.

11. The computing device of claim 10, wherein the one or more processors further execute the instructions to obtain a resource bound, and limit a number of operations in the query rewriting plan to the resource bound.

12. The computing device of claim 10, wherein generating the query rewriting plan further comprises iteratively adding operations to the query rewriting plan for corresponding search terms in the query, the operations added as nodes in a search tree.

13. The computing device of claim 10, wherein executing the query rewriting plan to fetch the retrieved data includes executing a fetch from query operation or a fetch from database operation that fetches an index of a corresponding access constraint.

14. The computing device of claim 13, wherein the access constraints include one or more cardinality constraints and one or more indices.

15. The computing device of claim 10, wherein executing the query rewriting plan to fetch the retrieved data includes executing an access view operation to fetch retrieved data from the cached view.

16. A non-transitory computer-readable medium storing computer instructions that when executed by one or more processors, cause the one or more processors to:
obtain a query and access constraints;
select a cached view containing results of the query as applied to a dataset stored in a database;
generate a query rewriting plan by:
adding a fetch from query operation to the query rewriting plan based on the access constraints when a rewritten query variable can be fetched from a query constant,
adding a fetch from database operation to the query rewriting plan based on the access constraints when a rewritten query variable can be fetched as a query variable that obtains bounded data from the database, and
adding an access view operation to the query rewriting plan when a rewritten query variable can be fetched from the cached view;
execute the query rewriting plan to fetch retrieved data; and
execute the query on the retrieved data to determine updated results to the query without reapplying the query to the dataset.

17. The non-transitory computer-readable medium of claim 16, wherein the instructions further cause the one or more processors to:
obtain a resource bound; and
limit a number of operations in the query rewriting plan to the resource bound.

18. The non-transitory computer-readable medium of claim 16, wherein generating the query rewriting plan further comprises iteratively adding operations to the query rewriting plan for corresponding search terms in the query, the operations added as nodes in a search tree.

19. The non-transitory computer-readable medium of claim 16, wherein executing the query rewriting plan to fetch the retrieved data includes executing a fetch from query operation or a fetch from database operation that fetches an index of a corresponding access constraint.

20. The non-transitory computer-readable medium of claim 16, wherein executing the query rewriting plan to fetch the retrieved data includes executing an access view operation to fetch retrieved data from the cached view.

* * * * *

UNITED STATES PATENT AND TRADEMARK OFFICE
CERTIFICATE OF CORRECTION

PATENT NO. : 10,649,994 B2
APPLICATION NO. : 15/966465
DATED : May 12, 2020
INVENTOR(S) : Wenfei Fan et al.

It is certified that error appears in the above-identified patent and that said Letters Patent is hereby corrected as shown below:

On the Title Page

Page 2, Column 1, Item (56), Other Publications, Lines 11-16, should read:
Benedikt, M., et al., "Generating Plans for Proofs," ACM Transactions on Database Systems, Vol. 40, No. 4, Article 22, Feb. 2016, 45 pages.
Cali, A., "Querying Data under Access Limitations," IEEE 24th International Conference on Data Engineering, Apr. 7-12, 2008, pages 50-59.

Signed and Sealed this
Thirtieth Day of June, 2020

Andrei Iancu
*Director of the United States Patent and Trademark Office*